UNITED STATES PATENT OFFICE.

CORNELIUS REAGLES, OF SCHENECTADY, NEW YORK.

IMPROVEMENT IN COMPOSITIONS FOR DENTAL PLATES, &c.

Specification forming part of Letters Patent No. 173,865, dated February 22, 1876; application filed December 27, 1875.

*To all whom it may concern:*

Be it known that I, CORNELIUS REAGLES, of Schenectady, in the county of Schenectady and State of New York, have invented a new and useful Improvement in Compound for Dental Plates and other uses, of which the following is a specification:

The object of this invention is to furnish an improved compound for dental plates, knife-handles, billiard-balls, surgical implements, brush-backs, and for the various purposes for which ivory, gutta-percha, and hard rubber are used, which may be molded, pressed, sawed, turned, planed, carved, inlaid, polished, &c., shall not be liable to combustion, shall have great tensile strength, and in the liquid form will make a water-proof varnish of great toughness and brilliancy.

The invention consists in the compound prepared of the ingredients in the proportions and manner hereinafter fully described.

In preparing my improved compound I use, pyroxyline, forty parts, by weight; compound ethylated camphor, twenty-five parts; flexible lac, fifteen parts; bleached caoutchouc shavings, five parts; cera alba, five parts; and pigments as required.

The pyroxyline is saturated with alcohol to prevent ignition by high temperature or friction, and while in a moistened state is finely divided by suitable machinery, and is then placed in a glass vessel that may be hermetically closed. The solvent compound ethylated camphor is then added to, and very thoroughly mixed with, the pyroxyline, and the vessel is closed and placed in a temperature of about 80° Fahrenheit for three or four days.

This solvent is compounded from sulphuric or nitric acid, alcohol, and camphor or camphor-oil, and is prepared by distillation and combination, thereby greatly increasing the efficiency of the ingredients as solvents, and also giving valuable properties to the pyroxyline. The stick-lac is then prepared, so that it may retain its flexibility, by dissolving it in mineral naphtha or ether. The ether is used only when an article is required that shall have neither odor nor taste—as, for example, for dental plates. The dissolved lac is then strained and decolorized, when a light color is required, by filtering it through animal charcoal, over a gentle heat, to maintain sufficient fluidity. The caoutchouc is then similarly prepared, and mixed with the lac. The Canada balsam is then taken, and the pigment (if any be required) is ground into it with a muller and stone, and it is added to the cera alba, which has previously been dissolved in ether over a gentle heat. These three compounds are then placed in a suitable mixing-machine, consisting of a cylinder surrounded with a steam-jacket, or other heating appliances, and a plunger, and thoroughly mixed, and then pressed until the mass is thoroughly homogeneous, the mixture being kept at a temperature not less than 212° and not over 248° Fahrenheit.

The machine should be formed with an escape-pipe, to allow such gases as may be formed to escape at each stroke of the plunger.

The mixture is then forced out in sheets, upon plates of smooth glass, where it is permitted to remain until a pellicle is formed upon it by evaporation. It is then piled between alternate layers of thick bibulous paper, in a common screw-press, and a gentle pressure is applied to it, which pressure should be slightly increased each day for a week, when the material will be in proper condition to harden off in the curing-room.

Additional solidity, if necessary, may be given to it by passing the sheets between steel rollers.

No particular temperature is required in the curing-room, except in winter, when a temperature of 70° will be sufficient.

It should be stated that where cera alba is mentioned, vegetable oil may be stubstituted.

As no pigments, except those produced from metal, will hold their color in this compound, the following are mentioned as suitable: For blue, oxide of cobalt; for red, sulphuret of mercury; for green, arsenite of copper; for yellow, bichromate of lead; for purple, purple of Cassius; for white, oxide of zinc; for black, ivory black. The neutral tones are made by intermixing the positive colors.

By the use of the above-mentioned pigments, perfect imitations may be produced of ivory, jet, malachite, turquoise, coral, agates, marble, amber, &c.

The compound may be made either opaque or transparent. It will resist most of the acids, will have a tensile strength about three times that of ivory, and by varying the proportions it may be made of any desired consistency.

Having thus described my invention, I claim as new and desire to secure by Letters Patent—

An improved compound, consisting of pyroxyline, compound ethylated camphor, flexible lac, caoutchouc shavings, Canada balsam, and cera alba, in about the proportions substantially as herein set forth and described.

CORNELIUS REAGLES.

Witnesses:
ISAAC V. REAGLES,
D. M. CHADSEY.